United States Patent [19]
Kin

[11] 3,881,682
[45] May 6, 1975

[54] CANDLE MOLD

[76] Inventor: Henry Kin, 11442 Southland Rd., Forest Park, Ohio 45240

[22] Filed: Aug. 3, 1973

[21] Appl. No.: 385,283

[52] U.S. Cl. .................. 249/94; 249/139; 249/164; 425/803
[51] Int. Cl. .......................................... B29d 31/00
[58] Field of Search ...... 425/803; 249/55, 85, 96–7, 249/101, 139, 160, 163–4, 168, 94; 264/275

[56] References Cited
UNITED STATES PATENTS

| | | | |
|---|---|---|---|
| 1,426,512 | 8/1922 | Schiffhauer | 249/139 |
| 2,552,810 | 5/1951 | O'Neill et al. | 249/96 |
| 3,109,201 | 11/1963 | Dulmage | 264/275 |
| 3,251,460 | 5/1966 | Edmonds | 249/155 |
| 3,309,738 | 3/1967 | Friedman | 249/164 |
| 3,332,658 | 7/1967 | Lemelson | 249/139 |
| 3,393,890 | 9/1968 | Lemelson | 249/96 |
| 3,752,433 | 8/1973 | Berman | 425/803 |
| 3,788,590 | 1/1974 | Hasselbach | 425/803 |
| 3,806,078 | 4/1974 | Achzehner | 425/803 |

FOREIGN PATENTS OR APPLICATIONS

| | | | |
|---|---|---|---|
| 106,746 | 1939 | Australia | 249/168 |

Primary Examiner—Robert D. Baldwin
Assistant Examiner—John McQuade
Attorney, Agent, or Firm—John G. Schenk

[57] ABSTRACT

A candle mold is shown having been formed out of a plastic vacuum formed material. Each side of the mold is formed with complementally formed flange and flange receiving grooves which engage each other in interlocking fashion when the sides are placed together. A wick supporting and centering device is incorporated with the mold and a mold stand may be used to hold the mold upright.

4 Claims, 10 Drawing Figures

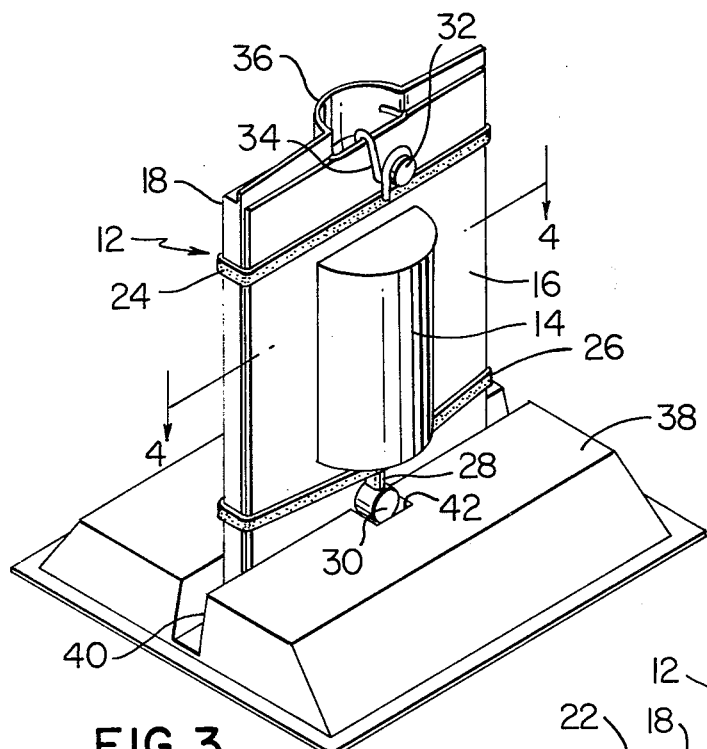
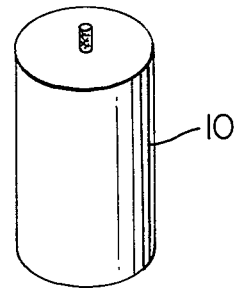
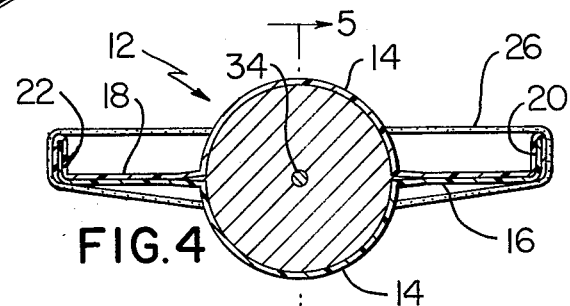
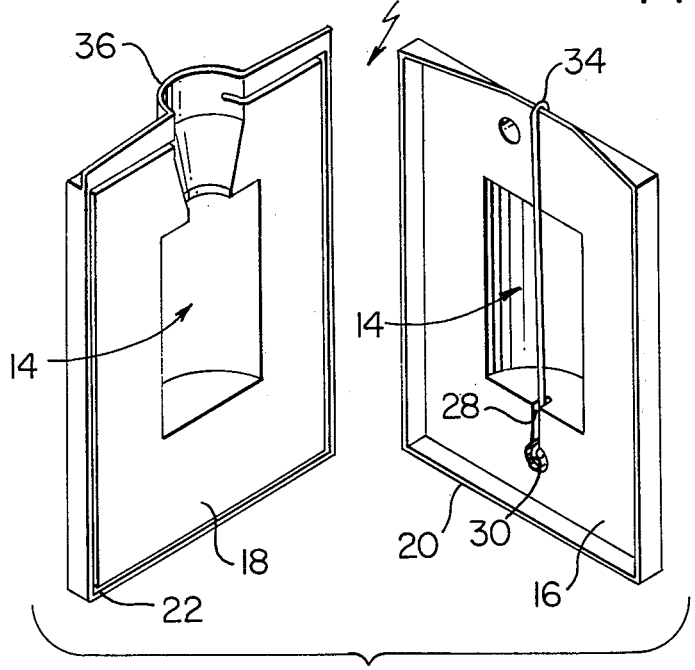
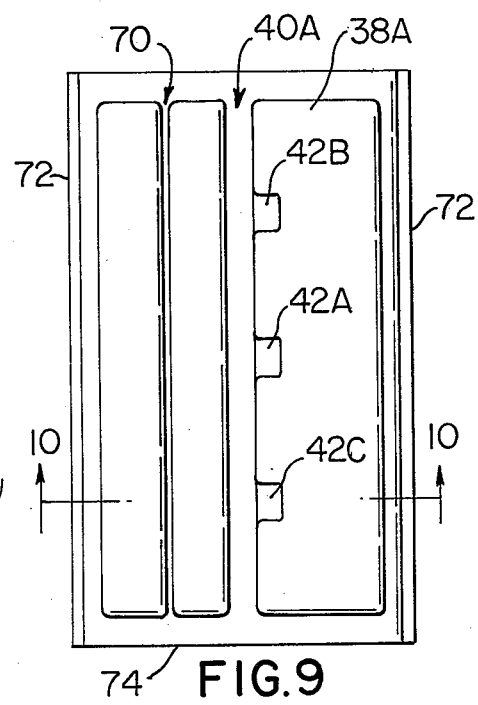

CANDLE MOLD

BACKGROUND OF THE INVENTION

This invention relates generally to candle molds and more particularly to a novel mold having improved sealing capabilities.

Candlemaking in the home has become a popular hobby or craft in recent years. Numerous candle molds are presently available to permit the making of various candles for the hobbyist or small volume manufacturer. The candle molds heretofore available have not been entirely satisfactory. Many such molds required that the seams be taped which is not satisfactory. Very often such seams would bulge so that a wide seam would be present in the resulting candle. In addition, the molds very often would leak the hot wax through the taped seams and many such molds required that the person have a bucket of sand or the like available in which to secure the mold upright.

Accordingly, it is an object of this invention to provide an improved candle mold which is substantially leakproof.

Another object of this invention is to provide a candle mold in which the respective sides have means to interlock one with the other so as to provide a good sealing structure as well as give support to the mold.

Yet another object of this invention is to provide a candle mold having means to center the wick in the resulting candle.

SUMMARY

This invention provides an improved candle mold which is of simple and economical construction yet is durable for use many times. The respective sides of the candle mold are formed with complementally shaped flanges and flange receiving grooves which interlock one with the other when the respective sides are placed together. Means are provided to support and center a wick within the mold such that the wick is precisely centered in the resulting candle. A pouring spout is provided for the mold. A mold stand may support the mold in an upright position.

Other objects, details, uses and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention in which:

FIG. 1 is a perspective view of an exemplary candle formed by the use of molds of this invention;

FIG. 2 is a perspective view of an exemplary candle mold in the open position which is used to form the candle of FIG. 1;

FIG. 3 is a perspective view of the candle mold of FIG. 2 in the operative position;

FIG. 4 is a sectional view taken along the line 4—4 of FIG. 3;

FIG. 1 is a fragmentary sectional view taken along line 7—7 of FIG. 6;

FIG. 9 is a plan view of another exemplary mold stand used to support the exemplary candle mold of FIG. 2.

DESCRIPTION OF THE ILLUSTRATED EMBODIMENT

Figure 5:
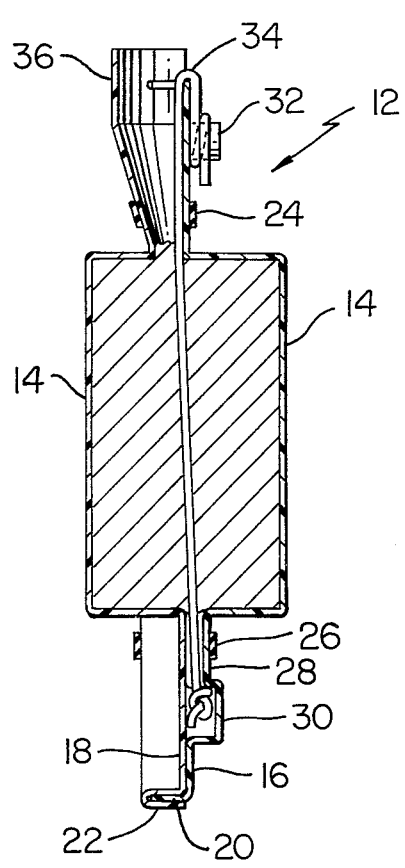
FIG. 5 is a sectional view taken along the line 5—5 of FIG. 4.

Reference is now made to FIG. 1 of the drawings which illustrates an exemplary candle 10 which has been formed through the use of the candle mold of this invention, which is designated generally by the reference numeral 12 as best seen in FIGS. 2 and 3. For illustrative purposes only, the candle 10 is shown to be in cylindrical form. It is obvious that the candle 10 can take many shapes depending on the candle form used in the mold 12.

Referring now to FIGS. 2 and 3, it is seen that the candle mold 12 is formed of two halves or sides 16 and 18, respectively. One half of the candle 14 is formed on each side 16 and 18. The forms 14 are so positioned on the respective sides 16 and 18 that when said sides are placed together as in FIG. 3, the forms 14 cooperate with one another to define the candle form desired.

Referring now to FIGS. 2, 4 and 5, it can be seen that the side 16 is formed about its periphery with a lip or flange 20. The side 18 is formed about its periphery with a complementary shaped lip or flange receiving groove 22. When the sides 16 and 18 are positioned together, the flange 20 and flange receiving groove 22 mate one with the other in interlocking fashion as specifically shown in FIGS. 4 and 5. The interlocking of the peripheral edges of the sides 16 and 18 provide an added strength anad support to the assembled candle mold 12. In addition, the interlocking of the respective peripheries serve as a further means to prevent hot wax from escaping from the mold. Should any wax proceed from the form 14 outwardly to the respective peripheral edge, the interlocking of the flange 20 with the flange receiving groove 22 helps to form a seal. Thus, as the wax proceeds outwardly the wax will naturally cool and have a tendency to solidify in the groove before the wax can escape from the mold. The sides 16 and 22 are held tightly together by any suitable means such as rubber bands 24 and 26 being placed thereabout. The rubber bands place a uniform pressure on the candle mold which assists in preventing the escape of wax from the mold 12.

The illustrative candle mold 12 is provided with novel wick placement and supporting means as best seen in FIGS. 2 3 and 5. The side 16 is formed with a slot or groove 28 extending from one end of the candle form 14. The slot 28 terminates in a wick retaining chamber or area 30. The slot 38 and chamber 30 are open to the inside of the side 16. Adjacent the other end of the side 16 is a peg or the like 32 formed on the outside of the side 16. One end of a wick 34 is tied into a knot and the knot is inserted into the chamber 30. The wick is then fed through the slot 28 and the other end extended over the end of the side 16 and wrapped about the peg 32. This secures the wick 34 to the side 16 and the wick is thus properly centered and positioned relative to the candle form 14.

A pouring spout 36 is formed in the side 18 of the mold 12. The spout 36 is in communication with the candle form 14. As best seen in FIGS. 3 and 5, the spout 36 is offset such that the wick 34 is properly centered when the sides 16 and 18 are positioned together. In the assembled position, a portion of side 16 forms one surface of the spout 36.

In use, the candle mold 12 must be supported in a vertical position. The mold 12 may be supported by any suitable means. A convenient means for supporting the mold 12 is by a mold stand 38 as seen in FIG. 3. The mold stand 38 is formed with a channel or slot 40 in which the mold 12 is seated. A transverse channel or slot 42 may be provided to receive the chamber 30. In this way, the mold 12 will be securely held in the mold stand 38.

In operation, when it is desired to pour a candle, the candle mold 12 is separated. A know is then tied in the wick 34 and placed in the chamber 30 and the other end of the wick 34 is wrapped about the peg 32. The sides 16 and 18 are placed together such that the flanges 20 are seated in interlocking fashion in the flange receiving grooves 22. One or more rubber bands are then placed about the mold 12 to secure the sides together. The assembled mold 12 is then inserted into the mold stand 38. The wax is then heated to liquid form, approximately 180°F., and then poured slowly into the spout 36. After the wax has cooled for about six hours the candle mold 12 is removed from the candle 10. A slightly seam line may exist in the candle. This seam line may be trimmed with any sharp instrument and any scrape marks may be removed by rubbing the candle with suitable means such as a nylon stocking. Excess wick at each end of the candle is then removed leaving a candle 10 of the desired shape and quality.

Figure 6:
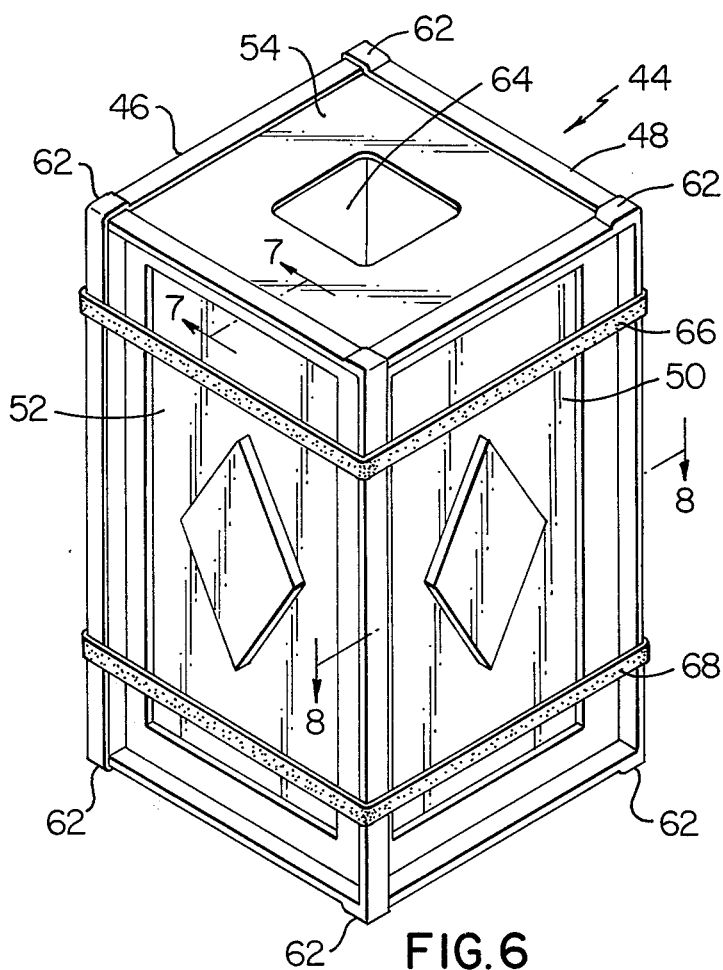
FIG. 6 is a perspective view of another exemplary candle mold incorporating similar interlocking features.
Figure 7:
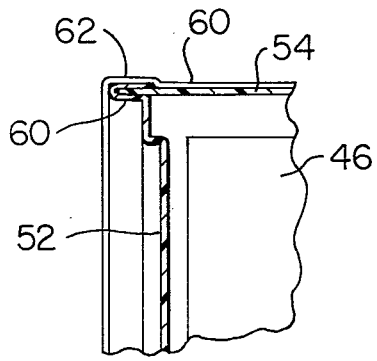
Figure 8:
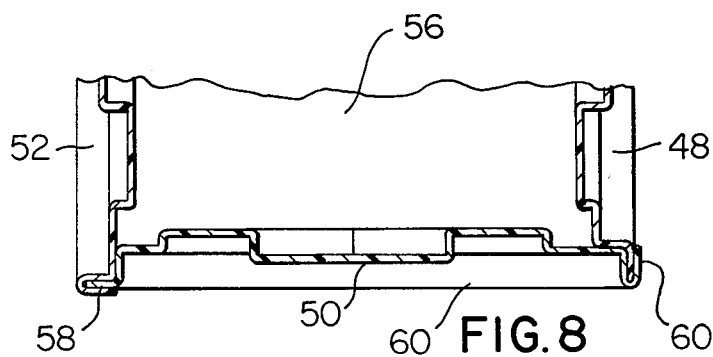
FIG. 8 is a fragmentary sectional view taken along line 8—8 of FIG. 6.

Another exemplary embodiment of this invention is illustrated in FIGS. 6-8 of the drawings. In this embodiment, a free standing candle mold designated generally as 44 is shown. For illustrative purposes only, the mold 44 is seen to have a rectangular shape. Thus, the mold 44 incorporated four sides 46-52, as well as a top 54 and a bottom 56 (FIG. 8).

The candle mold 44 utilizes similar interlocking flanges and grooves as hereinabove described. In this embodiment as seen in FIG. 8, each side is provided at its peripheral edge with a flange 58 along one edge and a flange receiving channel or groove 60 along the remaining three edges. Thus, the flange 58 of one side will interlock with the corresponding flange receiving groove 60 of the adjacent side. The corner portion 62 (FIGS. 6 and 7) of each of the flange receiving grooves 60 is enlarged at the top and bottom corner of each side. This permits receipt at such corner areas of a corresponding flange receiving groove 60 therein so as to facilitate the supporting of the top 54 and bottom 56. As best seen in FIG. 7, the top 54 is supported in interlocking fashion in the flange receiving groove 60. At the juncture or corner of the sides 46 and 52, for example, the flange receiving groove 60 engages in interlocking fashion the enlarged corner portion 62. Thus, in FIG. 7, the top 54 is carried by the flange receiving grooves 60 of each of the sides.

The bottom 56 is provided with a wick aperture (not shown). The top 54 is provided with a pouring aperture 64 through which the liquid wax is poured into the mold. The candle mold 44 is held together by any suitable means such as rubber bands or the like 66 and 68.

In operation, the candle mold 44 is assembled as hereinabove described. One end of a wick (not shown) is inserted through the wick aperture in the bottom 56. The end of the wick is secured on the outside of the candle mold 44 by any suitable means such as tying a knot in the end thereof. Tape or the like may be placed over the end of the wick and wick aperture hole to prevent leakage therethrough. The other end of the wick extends through the pouring aperture 64 and is wrapped about a shaft, pencil or the like, with a length greater than the dimension of the aperture 64. The wax is then poured into the candle mold 44 through the pouring aperture 64. When the mold is filled, the wick may be positioned in the center of the candle mold 44 by movement of the shaft or pencil. The interlocking of the respective flanges and flange receiving grooves provide a suitable seal to prevent escape of the wax from the candle mold 44. After the wax has cooled a sufficient time, the candle mold 44 may be removed and any seams may be eliminated, as previously described.

Figure 10:
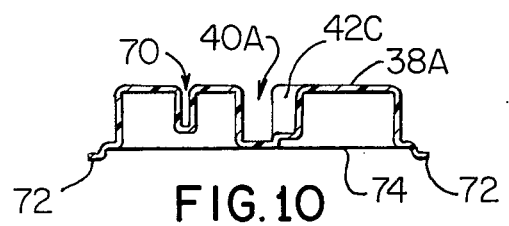
FIG. 10 is a sectional view of the mold stand taken along line 10—10 of FIG. 9.

Reference is now made to FIGS. 9 and 10 of the drawings which show another exemplary embodiment of a mold stand similar to that shown in FIG. 3. The mold stand of FIGS. 9 and 10 is designated generally as 38A. Such portions of the mold stand 38A which are similar to that of the mold stand 38 of FIG. 3 will be designated with the same reference numeral followed by the letter designation A and not described again. The mold stand 38A is formed with a channel or slot 40A and a transverse channel or slot 42. Additional transverse channels or slots 42B and 42C are also formed along the channel 40A. Thus, the mold may be inserted into the channel 40A such that the chamber 30 (FIG. 5) may be seated in any of the transverse channels. A second channel or slot 70 is formed in the stand 38A. The channel 70 is of a much narrower dimension than the width of the channel 40A. Hence, it is seen that the mold stand 38A will serve to support not only the candle molds hereinabove described in the wide channel 40A, but will also support prior art type candle molds in the narrow slot 70.

As best seen in FIG. 19, the mold stand 38A is formed with edges 72 along each side thereof which serve as legs or supports for the stand 38A. The edges 72 are formed so as to support the base 74 of the mold stand 38A slightly above the surface upon which the mold stand rests. Thus, when a candle mold is placed in the slot or channel 40A, the weight of the mold and wax poured therein will cause a deflection and bending of the mold 38A. Thus, the base 74 will be urged downwardly which will cause the walls of the channel 40A to deflect inwardly so as to pinch and securely hold the mold being supported therein.

It may be noted that the illustrative embodiments hereinabove described have been specifically described with respect to the respective candle mold sides having flanges or flange receiving grooves at the periphery thereof. It should be noted that the specific configuration of the flange and flange receiving grooves on any one candle mold side may be varied. It is only necessary that complementally formed flange and grooves be provided so as to provide an interlock therebetween thus forming a seal between the respective sides to prevent escape of wax therethrough.

It can be seen that this invention provides a candle mold which is of simple and economical construction, is easy to assemble and use and, due to the interlocking feature, prevents escape of the wax therefrom. Accordingly, the objectives hereinbefore set forth have been accomplished.

While present exemplary embodiments of this invention have been illustrated and described, it will be recognized that this invention may be otherwise variously embodied and practiced by those skilled in the art.

What is claimed is:

1. A candle mold comprising a plurality of sides, said sides cooperating with one another to define a candle form therebetween, the periphery of said sides having complementally formed flange and flange-receiving grooves respectively therealong wherein said flange and grooves cooperatively engage each other in interlocking fashion when said sides are placed together, a wick receiving chamber and slot formed in one side of one mold side adjacent one end thereof, said chamber and slot opening to the inside of the mold, securing means on the outside of said one side of the mold adjaacent the other end thereof wherein one end of a wick is placed in said chamber and the other end of said wick is secured to said securing means whereby the wick is centered in the resulting candle, and spout means in the other mold side to permit pouring of hot wax into the mold.

2. The mold as set forth in claim 1 in which said plurality of sides includes two sides which when placed face to face against each other and define the candle form therebetween, one of said sides being formed with said flange about its periphery and the other side being formed with said flange receiving groove about its periphery.

3. The mold as set forth in claim 2 in which said spout means includes a spout formed at one end of the other of said mold sides, said spout being in communication with the candle form wherein said spout is offset from the centerline of the candle form when said mold sides are engaged one with the other.

4. The mold as set forth in claim 3 further comprising a support stand, said support stand having a channel therethrough to receive one end of the assembled mold to support the mold in a vertical position, said support stand further including a pair of peripheral edges projecting downward from a base, said edges supporting said base of said support stand above a supporting surface wherein said mold support stand will deflect downwardly due to the weight of the mold thereby causing the walls of said channel to bend inwardly to engage the mold and further comprising a transverse channel connected with said first channel to receive and hold said wick receiving chamber of said mold.

* * * * *